(12) United States Patent
Werkander

(10) Patent No.: US 6,519,234 B1
(45) Date of Patent: Feb. 11, 2003

(54) METHOD AND ARRANGEMENT FOR TRANSFERRING INFORMATION USING AN EXISTING MESSAGE BASED SERVICE IN A DIGITAL NETWORK

(75) Inventor: Peter Werkander, Sollentuna (SE)

(73) Assignee: Sendit AB, Stockholm (SE)

( * ) Notice: Subject to any disclaimer, the term of this patent is extended or adjusted under 35 U.S.C. 154(b) by 0 days.

(21) Appl. No.: 09/646,829
(22) PCT Filed: Mar. 18, 1999
(86) PCT No.: PCT/SE99/00428
§ 371 (c)(1), (2), (4) Date: Jan. 2, 2001
(87) PCT Pub. No.: WO99/52247
PCT Pub. Date: Oct. 14, 1999

(30) Foreign Application Priority Data

Mar. 24, 1998 (SE) ................................................ 9800992

(51) Int. Cl.⁷ ................................................ H04Q 7/00
(52) U.S. Cl. ...................................................... 370/328
(58) Field of Search ............................... 370/328–331, 370/385–387, 514, 509, 410, 522, 463, 357, 260–261, 359, 347, 280; 455/456–466, 154.1, 160.1, 445, 412–415, 422, 186.1; 379/230; 707/4–10, 101–107; 704/267, 258–260; 340/945, 995; 709/207, 227–231, 248, 204; 375/365, 317

(56) References Cited

U.S. PATENT DOCUMENTS

| | | | | |
|---|---|---|---|---|
| 4,994,966 A | * | 2/1991 | Hutchins | .................... 364/419 |
| 5,481,544 A | * | 1/1996 | Baldwin et al. | ............ 370/392 |
| 6,094,575 A | * | 7/2000 | Anderson et al. | ........... 455/422 |
| 6,195,534 B1 | * | 2/2001 | Sakoda et al. | ................ 455/45 |
| 6,212,173 B1 | * | 4/2001 | Lindsay et al. | ............. 370/331 |

FOREIGN PATENT DOCUMENTS

| | | |
|---|---|---|
| EP | 0801512 A2 | 10/1997 |
| WO | WO 93/16564 | 8/1993 |
| WO | WO 97/08906 | 3/1997 |
| WO | WO 97/20443 | 6/1997 |

* cited by examiner

Primary Examiner—Kwang Bin Yao
Assistant Examiner—Prenell Jones
(74) Attorney, Agent, or Firm—Workman, Nydegger & Seeley

(57) ABSTRACT

Methods and arrangements are provided for transmitting information in a message using an existing message based service in a digital mobile network. According to the invention, the message is provided with an information field intended to be extracted from the message by the receiver. Furthermore, the message is provided with a pointer field in a position which is given by a predetermined rule while using a predetermined syntax and including information which indicates where in the message the information field is arranged.

32 Claims, 3 Drawing Sheets

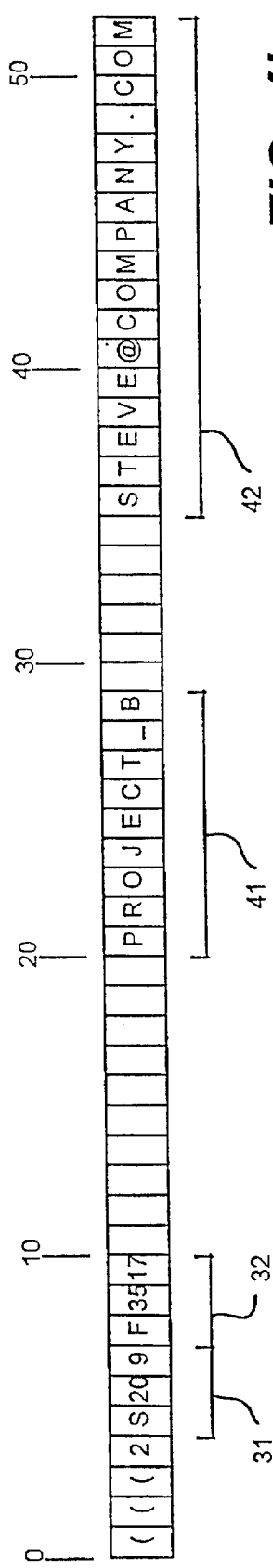
FIG. 4a
FIG. 4b
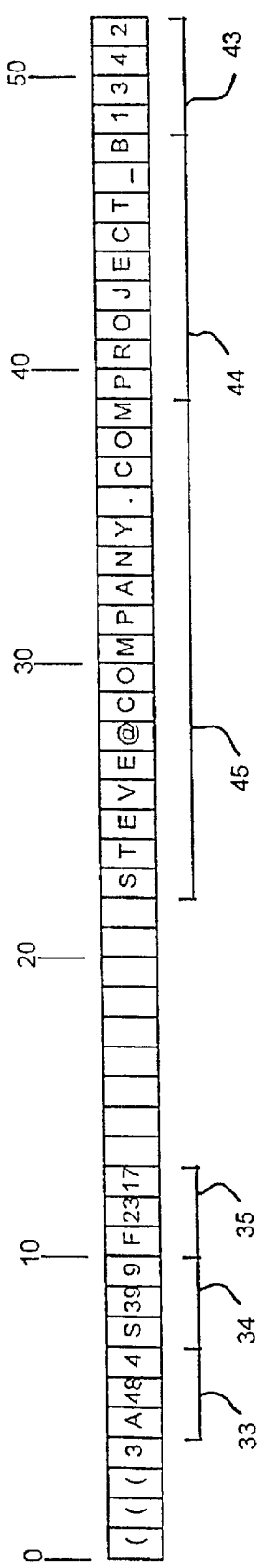
FIG. 4c

METHOD AND ARRANGEMENT FOR TRANSFERRING INFORMATION USING AN EXISTING MESSAGE BASED SERVICE IN A DIGITAL NETWORK

FIELD OF THE INVENTION

The present invention relates to a method and an arrangement for transferring to a receiver information in a message using an existing message based service in a digital mobile network.

The present invention also relates to a method and an arrangement for receiving in a receiver information in a message which has been transferred to the receiver with the aid of an existing message based service in a digital mobile communication network.

BACKGROUND OF THE INVENTION

There are currently a number of examples of message based services which are provided according to given standards in digital mobile networks. As examples, mention can be made of the message based services SMS and USSD in the digital mobile network GSM, but the invention is also applicable to similar message based services in other existing or future digital mobile networks such as GPRS, CDMA, D-AMPS (IS-136), PDC (Pacific Digital Cellular), W-CDMA (Wideband Code Division Multiple Access) and UMTS/IMT-2000.

These message based services are used today in many different ways, normal to transfer text information which is to be presented on a display of a receiving mobile station, but also to transfer text or date which should be interpretable by the receiving mobile station in different ways, for instance, as described in the international patent specification WO 97/08906 in the name of the applicant of the present invention. Lately, said message based services have therefore been used as a basis for the provision of many new types of supplementary services.

When information in the form of text or data is to be incorporated in such a message in such manner that the receiver can collect the information from the message to treat it in the desired manner, it is necessary that the sender and the receiver have agreed on a syntax of the configuration of the message, i.e. the sender and the receiver must agree how the information should be structured in the message. This is a problem since different operators or people involved prefer different types of syntax, for instance, depending on language differences but also depending on different wishes about the type of information or service to be comprised in or provided by the message. If the message based service should also be used for transferring information in connection with different types of services, each service must in many cases have its own syntax and therefore both the sender and the receiver have to master several syntaxes.

OBJECT OF THE INVENTION

The object of the invention is to overcome the above problems by providing a functionality which in a simple way takes different operators' demands or wishes for different syntaxes into account and also can handle such demands.

SUMMARY OF THE INVENTION

According to a first aspect of the invention, the above-mentioned object is achieved by a method and an arrangement of the type mentioned by way of introduction for transmitting to a receiver information in a message using an existing message based service in a digital mobile network, the invention being characterised in that said message is provided with, on the one hand, an information field which is intended to be extracted from said message by said receiver and, on the other, a pointer field in a position which is given by a predetermined rule while using a predetermined syntax, said pointer field comprising information which indicates where in said message said information field is arranged.

According to a second aspect of the invention, the above-mentioned object is achieved by a method and an arrangement of the type mentioned by way of introduction for receiving in a receiver information in a message which has been transferred to the receiver by means of an existing message based service in a digital mobile network, the invention being characterised in that a pointer field, which is arranged in the message and comprises information indicating where in said message a relevant information field is arranged, is read in said message from a position which is given by a predetermined rule while using a predetermined syntax, and that said information field is extracted in said message from the position which is indicated by said pointer field.

Thus the invention is based on the idea of also providing the message with a pointer field, in addition to the information fields (text and data) which should be extractable and treatable intelligently in the receiver, said pointer field indicating where the information fields intended for extraction can be fetched in the message. In this way, different operators only have to agree on the rule which indicates where the actual pointer field should be located in the message, how it should be structured and how the information in the pointer field should be interpreted. On the basis of such a rule, individual user groups can choose to locate and structure their information fields in the way they wish. One and the same rule (one and the same format) can thus be used to define different types of services.

According to a preferred embodiment of the invention, said pointer field comprises information which indicates to what type of information said information field relates. In this way, the pointer field can indicate whether the information in the information field consists of a telephone number, an e-mail address, an IP address, an identification number, a password, the identity of the sender, the size of a stored e-mail or fax message associated with the received message, the computed time for transferring such an e-mail or fax message, or the like. This is suitably achieved by one or more characters in the pointer field containing a binary coded hexadecimal number, which according to the predetermined rule is associated with a certain type of information according to that stated above. Hence, this gives the possibility of defining various types of notifications/messages/services on the basis of one and the same rule.

According to one embodiment, said pointer field is used to indicate information fields which comprise text or data which is to be presented visually or stored in the receiver. However, a particularly preferred alternative is that of using said pointer field to indicate information fields which comprise an identifier intended to be used by said receiver when fetching or re-routing a file stored at a place which is remote from said receiver, for instance, an agent of the type disclosed in the above-mentioned international patent specification WO 96/01077, which is incorporated herein by reference.

A preferred way of identifying in the pointer field the position of the associated information field is that the pointer field in accordance with the determined rule comprises information which indicates in said message the position which corresponds to the beginning of said information field. In addition, it is preferred that the pointer field should also comprise information which indicates the length of, or the position in said message which corresponds to the end of, said information field. However, it will be appreciated that other ways of indicating the position of the associated information field are also applicable.

It should be understood that the most interesting application of the invention is the case where said receiver is a mobile station, such as a mobile telephone, or a so-called smart phone. It can be established that mobile telephones are increasingly integrated with a preferably portable computer to form a single unit, and it should be understood that the invention is, of course, applicable to such units. It should, however, be understood that the invention is not limited to the case where the receiver is a mobile station. The communication can just as well take place between, for instance, two fixed points as long as said message based service in the mobile network is used according to the invention.

It is preferred that said digital mobile network is the GSM network and that said message based service is either SMS or USSD. Consequently, the following description of an exemplifying embodiment will refer to the message based service SMS in the GSM network. As previously mentioned, it should, however, be understood that the invention is not limited to these systems, but can also be applied to other existing or future digital mobile networks having message based services of a similar kind, such as the digital mobile networks GPRS, CDMA, D-AMPS (IS-136), PDC (Pacific Digital Cellular), W-CDMA (Wideband Code Division Multiple Access) and UMTS/IMT-2000.

Additional advantages, aspects and features of the invention will appear from the following description of an exemplifying embodiment.

BRIEF DESCRIPTION OF THE DRAWINGS

An exemplifying embodiment of the invention will now be described with reference to the accompanying drawings, in which:

FIGS. 3a–3c show examples of embodiments of an SMS message according to prior-art technique; and FIGS. 4a–4c show examples of embodiments of an SMS message according to a preferred embodiment of the present invention.

DETAILED DESCRIPTION OF AN EXEMPLIFYING EMBODIMENT

A system for providing a short message based service, which is structured according to the invention, will now be described with reference to FIG. 1.

Figure 1:
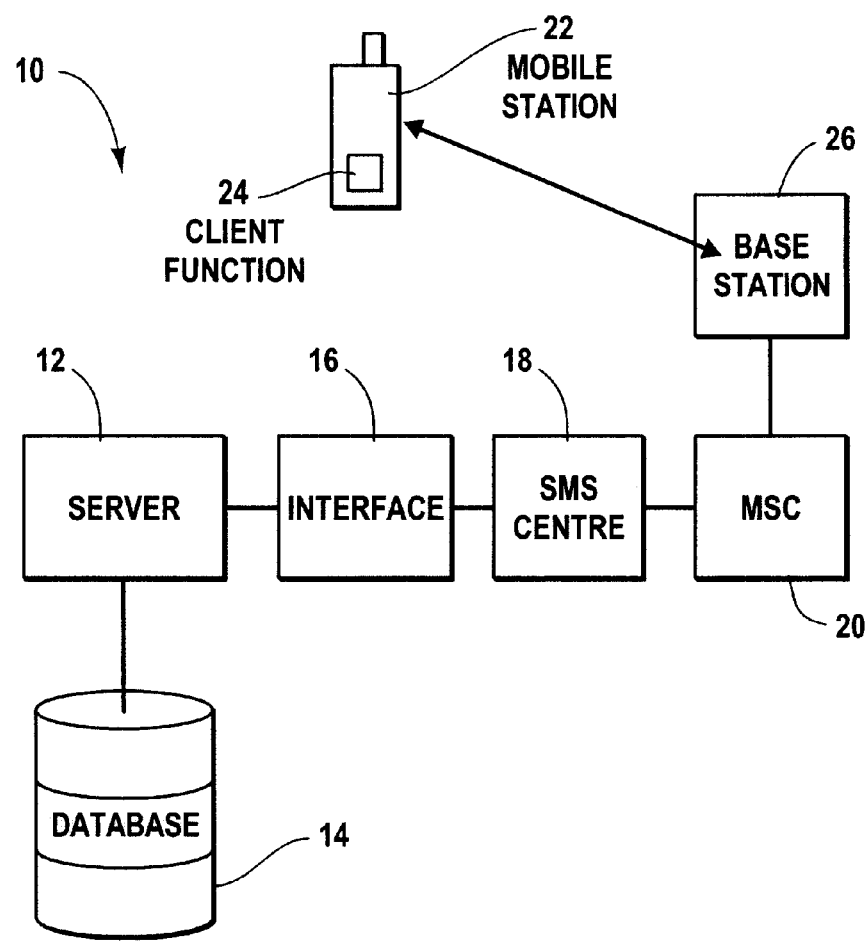
FIG. 1 shows schematically a system for providing a short message based service according to the invention.

The system 10 in FIG. 1 comprises an MSC 20 (Mobile Service Switching Centre) which is included in the digital mobile network GSM (Global System for Mobile Communication) and which communicates via a base station 26 with a mobile station 22. The mobile station 22 can, for instance, be a mobile telephone, a portable computer connected to the network, or a "smart phone", which can essentially be considered as a combination of the mobile telephone and the portable computer. The MSC 20 administers the traffic to/from the mobile station 22, which can include, for instance, person-to-person calls as well as voice mailbox messages, short message based services, such as SMS, and the like.

SMS messages, which are to be routed through the mobile network, are connected via a so-called SMS centre (SMS-C) 18, which directs SMS messages to the right receiver. In this example, the system 10 also includes a server 12 which provides different kinds of services via the mobile network and which communicates with the mobile network via an interface 16. For this purpose, the server 12 uses a database 14 for storing, preferably temporarily, different types of messages, such as e-mails, fax, SMS messages and the like, or other contents such as a WWW page or the like, which are to be sent to the receiver in question on a suitable occasion. The messages stored in the database 14 can, for instance, be created in the actual server 12, but they could just as well originate from, for instance, mobile stations connected to the mobile network or from users who communicate via some other type of network to which the server 12 has direct or indirect access, such as the Internet.

Furthermore, the mobile station 22 comprises a client function 24 which provides the mobile station with means for decoding and structuring the SMS messages, for instance, in accordance with the description below.

An exemplifying mode of operation of the system 10 in FIG. 1 will now be described. According to this mode of operation, the server 12 is arranged at a teleoperator's to receive e-mails addressed to the subscriber having the mobile station 22. At the reception of such an e-mail message, the server 12 stores it in the database 14. At the same time, the server 12 creates a notification SMS message which includes an identifier for the received e-mail message, also referred to as "agent", which indicates in a unique manner a route to the location of the associated e-mail message on the server. The identifier can, for instance, include a telephone number to the server 12, a password and a unique address of the specific e-mail message. This SMS message is subsequently sent to the mobile station 22 via the interface 16, SMS centre 18, MSC 20 and base station 26. At the reception thereof, the client function 24 in the mobile station 22 decodes the identifier received in the SMS message, the owner of the mobile station 22 being able to initiate down-loading, forwarding or the like of the stored e-mail message by means of the identifier.

The general structure of a message, here referred to as SMS message, according to the existing message based service SMS in the digital mobile network GSM will now be described with reference to FIG. 2. As is evident from FIG. 2, an SMS message 20 comprises essentially three parts: a head portion 21 whose configuration is to a great extent the result of a standard defined for the SMS service; a user text portion 22 which usually includes the actual message to the receiver (this is the text portion which is normally shown on the display of the mobile station, as will be described below); and a check sum 23 which is used to verify that the SMS message has been received correctly in its entirety. The actual user text portion 22 typically consists of either 160 characters containing 7 bits or 140 characters containing 8 bits. Each character containing 7 bits is usually represented in binary coded hexadecimal form in ASCII code or the like.

Figure 2:
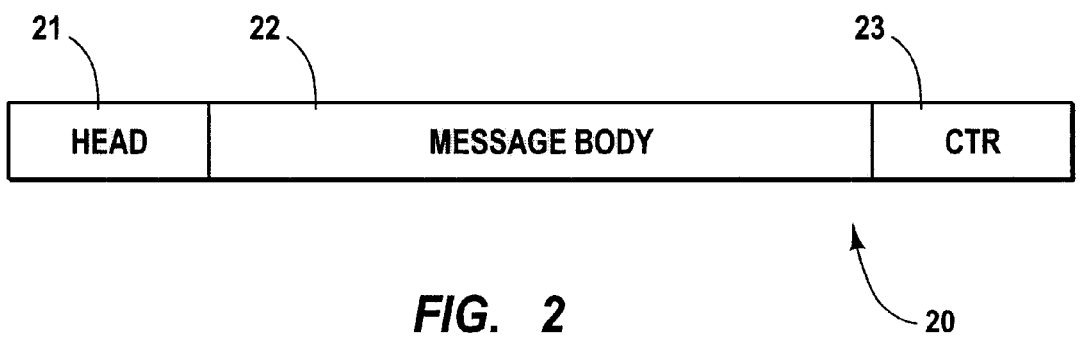
FIG. 2 shows schematically the general structure of a message in accordance with the existing message based service SMS in the digital mobile network GSM.

When designing services which make use of SMS messages of the kind shown in FIG. 2, it is primarily the structure of the user text portion 22 which is modified depending on the current application, since the configuration of the head portion 21 and the check sum 23 is mainly the result of a standard defined for the mobile network. Thus the examples of structures of an SMS message which are shown in FIGS. 3a–3c and FIGS. 4a–4c below relate to the structure of the actual user text portion 22, which does not, however, lead to any restrictions on the invention in this respect.

Examples of structures of the user text portion of an SMS message according to prior-art technique will now be described with reference to FIGS. 3a–3c. It is to be noted that each square in the SMS messages in FIGS. 3a–3c and FIGS. 4a–4c corresponds to a character of 7 bits which when transferred is usually represented in a binary coded hexadecimal form in ASCII code or the like. In addition, it is assumed in these figures that the character "/" is intended to signify end of line.

In FIG. 3a, the SMS message is structured as a conventional text message intended to be read by the receiver. As a result, the message will be presented on the display of the mobile station as follows:

HELLO JOHN
CALL 8246
STEVE

In FIG. 3b, the user text portion of the SMS message begins with the characters "##", which in this case is assumed to be an instruction which indicates to the receiving mobile station that the subsequent text field is structured in accordance with a predetermined syntax. In the case shown, it is assumed that this predefined syntax indicates that the characters which are located between the initial characters "##" and the next character for end of line "/" relate to a sender, and that the subsequent characters up to the next character for end of line "/" relate to the subject of the message. Depending on the structure of the system, the client function can thus derive this information from the SMS message and, for instance, present the information as follows:

From: STEVE@COMPANY.COM
Subject: PROJECT B

If in this case the client function in the receiving mobile station is not equipped to recognise a message which follows the predetermined syntax, the client function will simply interpret the message as an ordinary text message and thus present the message as follows:

STEVE@COMPANY.COM
PROJECT B

In FIG. 3c, the user text portion of the SMS message begins with the characters "#*", which in this case is assumed to be an instruction which indicates to the receiving mobile station that the subsequent text field is structured in accordance with a predetermined syntax, which in this case also includes an identifier, also referred to as "agent", of the kind discussed, inter alia, with reference to FIG. 1. In the illustrated case, it is thus assumed that this predetermined syntax indicates that the characters which are located between the initial characters "#*" and the next character for end of line "/" relate to a sender, that the subsequent characters up to the next character for end of line "/" relate to the subject of the message, and that the four characters which are placed at the end of the message constitute the identifier or the agent. Thus, the client function can derive this information from the SMS message and, for instance, present the information as follows:

From: STEVE@COMPANY.COM
Subject: PROJECT B
JobId: 1342

The actual identification 1342 can subsequently be used for down-loading or forwarding, preferably automatically, of the e-mail message which the identifier relates to.

If in this case the client function in the receiving mobile station is not equipped to recognise a message according to the predetermined syntax, the client function will simply interpret the message as an ordinary text message and thus present the message as follows:

* STEVE@COMPANY.COM
PROJECT B
1342

Examples of structures of an SMS message according to a preferred embodiment of the present invention will now be described with reference to FIGS. 4a–4c. In these figures, it is thus assumed that the client function in the receiving mobile station is equipped to receive SMS messages which are structured in accordance with a rule according to the invention, as will be discussed below.

In FIG. 4a the SMS message is structured as a conventional text message to be read by the receiver. Since the message does not contain any specific characters which indicate to the client function in the mobile station that the message is formatted according to the defined rule, the message will be interpreted as a conventional text message and thus be presented on the display of the mobile station as follows:

HELLO JOHN
CALL 8246
STEVE

In FIG. 4b, the user text portion of the SMS message begins with the characters "(((", which in this embodiment is assumed to be an instruction which indicates to the receiver that the message is structured according to the determined rule. (In this connection, it should be mentioned that this type of instruction could also be embedded in the heading of the SMS message or the like.) In this case, the rule implies that the three initial characters will be followed by a digit character which indicates how many pointer fields, each comprising three characters and each being related to a corresponding information field, follow after the digit character. Consequently, in FIG. 4b the fourth character indicates that two pointer fields 31, 32 follow the digit character. Each of these pointer fields comprises a first character which indicates what type of information is included in the information field to which the pointer field relates, a second character which indicates the character position in the message in which the associated information field begins, and a third character which indicates the size (number of characters) of the associated information field.

Thus, in FIG. 4b the client function establishes that the message contains two pointer fields 31, 32, the information field 41 which the first pointer field 31 indicates relating to a subject field (S="subject") which starts in the character position 20 and which has a length of 9 characters, and the information field 42 which the second pointer field 32 indicates relating to a sender field (F="from") which starts in the character position 35 and which has a length of 17 characters. On the basis of the information provided by these pointers, the client function can collect said information fields and present them, for instance, in a manner similar to that used for the message in FIG. 3b:

From: STEVE@COMPANY.COM
Subject: PROJECT B

In FIG. 4c, the user text portion of the SMS message also begins with the characters "(((", which thus in this case also indicates to the receiver that the message is structured in accordance with the determined rule. The digit character which according to the determined rule follows the three initial parentheses indicates in FIG. 4c that three pointer fields 33, 34, 35, each consisting of three characters, follow the digit character in this message. Thus the receiver can establish that the information field 43 which the first pointer field 33 indicates relates to an identifier field (A="agent") which starts in the character position 48 and has a length of 4 characters, that the information field 44 which the second pointer field 34 indicates relates to a subject field (S="subject") which starts in the character position 39 and has a length of 9 characters, and that the information field 45 which the third pointer field 35 indicates relates to a sender field (F="from") which starts in the character position 23 and has a length of 17 characters. On the basis of the information provided by these pointers, the client function can, in a manner similar to that in FIG. 4b, collect said information fields and present them, alternatively use the identifier to forward or down-load, for instance, an e-mail or fax message related to the SMS message.

If in this case the client function in the receiving mobile station is not equipped to recognise a message in accordance with the predetermined rule, the client function will simply interpret the message as a common text message and thus present the message as an ordinary text in a manner similar to that described with reference to FIGS. 3a–3c.

Even if the invention has been described above with reference to an exemplifying embodiment, modifications and changes can be made within the scope of the invention, which is defined in the appended claims. As an example, a pointer field can be structured to indicate a plurality of different information fields, or a plurality of pointer fields can indicate one and the same information field, even if each pointer field in the exemplifying embodiment above indicates a respective individual information field.

What is claimed is:

1. A method for transmitting to a receiver information in a message using an existing message based service in a digital mobile network, said method comprising the steps of:
   providing said message with an information field which is intended to be extracted from said message by said receiver; and
   providing said message with a pointer field in a position which is given by a predetermined rule while using a predetermined syntax and comprising information which indicates where in said message said information field is arranged.

2. A method according to claim 1, comprising the step of providing said pointer field with information which indicates to what type of information said information field relates.

3. A method according to claim 1, wherein said information field comprises text or data which is to be presented visually or stored in the receiver.

4. A method according to claim 1, wherein said information field comprises an identifier intended to be used by said receiver when down-loading or forwarding a file stored at a place which is remote from said receiver.

5. A method according to claim 1, comprising the step of providing said pointer field with at least one of the following types of information:
   information which indicates in said message the position which corresponds to the beginning of said information field; and
   information which indicates the length of, or the position in said message which corresponds to the end of, said information field.

6. A method according to claim 1, wherein said receiver is a mobile station, such as a mobile telephone, a so-called smart phone or a portable computer having mobile communication capability.

7. A method according to claim 1, wherein said digital mobile network is the so-called GSM network and said message based service is either SMS or USSD.

8. A method according to claim 1, wherein said message is structured to comprise more than one information field and corresponding pointer fields.

9. A method for receiving in a receiver information in a message which has been transferred to the receiver with the aid of an existing message based service in a digital mobile network, said method comprising the steps of:
   reading, in said message from a position which is given by a predetermined rule while using a predetermined syntax, a pointer field which is arranged in the message and comprises information which indicates where in said message a relevant information field is arranged; and
   extracting said information field in said message from the position which is indicated by said pointer field.

10. A method according to claim 9, comprising the step of extracting from said pointer field information which indicates to what type of information said information field relates and treating said information field in accordance therewith.

11. A method according to claim 9, wherein said information field comprises text or data which is to be presented visually or stored in the receiver.

12. A method according to claim 9, wherein said information field comprises an identifier intended to be used by said receiver when down-loading or forwarding a file stored at a place which is remote from said receiver.

13. A method according to claim 9, comprising the step of extracting from said pointer field information which indicates at least one of the following types of information:
   information which indicates in said message the position which corresponds to the beginning of said information field; and
   information which indicates the length of, or the position in said message which corresponds to the end of, said information field.

14. A method according to claim 9, wherein said receiver is a mobile station, such as a mobile telephone, a so-called smart phone or a portable computer having mobile communication capability.

15. A method according to claim 9, wherein said digital mobile network is the so-called GSM network and said message based service is either SMS or US SD.

16. A method according to claim 9, wherein said message is structured to comprise more than one information field and corresponding pointer fields.

17. An arrangement for transmitting to a receiver information in a message using an existing message based service in a digital mobile network, comprising means for providing said message with an information field intended to be extracted from said message by said receiver, and for providing said message with a pointer field in a position which is given by a predetermined rule while using a predetermined syntax and comprising information which indicates where in said message said information field is arranged.

18. An arrangement for receiving information in a message which has been transferred with the aid of an existing message based service in a digital mobile network, comprising means for reading, in said message from a position which is given by a predetermined rule while using a predetermined syntax, a pointer field which is arranged in the message and comprises information which indicates where in said message a relevant information field is arranged, and for extracting said information field in said message from the position which is indicated by said pointer field.

19. An arrangement according to claim 17, wherein said pointer field is provided with information which indicates to what type of information said information field relates.

20. An arrangement according to claim 17, wherein said information field comprises text or data which is to be presented visually or stored in the receiver.

21. An arrangement according to claim 17, wherein said information field comprises an identifier intended to be used by said receiver when down-loading or forwarding a file stored at a place which is remote from said receiver.

22. An arrangement according to claim 17, wherein said pointer field is provided with at least one of the following types of information:

information which indicates in said message the position which corresponds to the beginning of said information field; and information which indicates the length of, or the position in said message which corresponds to the end of, said information field.

23. An arrangement according to claim 17, wherein said receiver is a mobile station, such as a mobile telephone, a smart phone, or a portable computer having mobile communication capability.

24. An arrangement according to claim 17, wherein said digital mobile network is a GSM network and said message based service is either SMS or USSD.

25. An arrangement according to claim 17, wherein said message is structured to comprise more than one information field and corresponding pointer fields.

26. An arrangement according to claim 18, wherein said pointer field is provided with information which indicates to what type of information said information field relates.

27. An arrangement according to claim 18, wherein said information field comprises text or data which is to be presented visually or stored in the receiver.

28. An arrangement according to claim 18, wherein said information field comprises an identifier intended to be used by said receiver when down-loading or forwarding a file stored at a place which is remote from said receiver.

29. An arrangement according to claim 18, wherein said pointer field is provided with information which indicates at least one of the following types of information:

information which indicates in said message the position which corresponds to the beginning of said information field; and information which indicates the length of, or the position in said message which corresponds to the end of, said information field.

30. An arrangement according to claim 18, wherein said receiver is a mobile station, such as a mobile telephone, a so-called smart phone or a portable computer having mobile communication capability.

31. An arrangement according to claim 18, wherein said digital mobile network is a GSM network and said message based service is either SMS or USSD.

32. An arrangement according to claim 18, wherein said message is structured to comprise more than one information field and corresponding pointer fields.

* * * * *

UNITED STATES PATENT AND TRADEMARK OFFICE
CERTIFICATE OF CORRECTION

PATENT NO.     : 6,519,234 B1
DATED          : February 11, 2003
INVENTOR(S)    : Peter Werkander It is certified that error appears in the above-identified patent and that said Letters Patent is hereby corrected as shown below:

Column 1,
Line 31, change "normal" to -- normally --
Line 33, change "date" to -- data --

Column 8,
Line 50, change "US SD" to -- USSD --

Signed and Sealed this

Nineteenth Day of August, 2003

JAMES E. ROGAN
*Director of the United States Patent and Trademark Office*